Patented Dec. 3, 1929

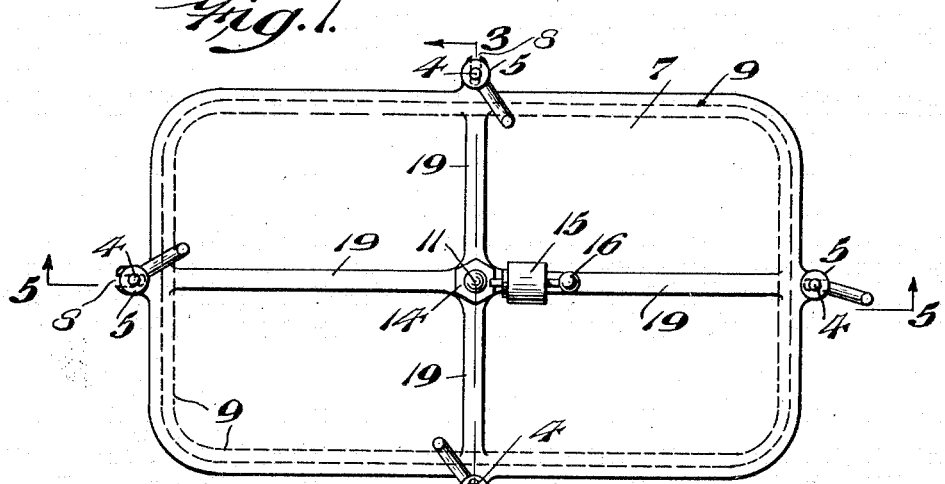
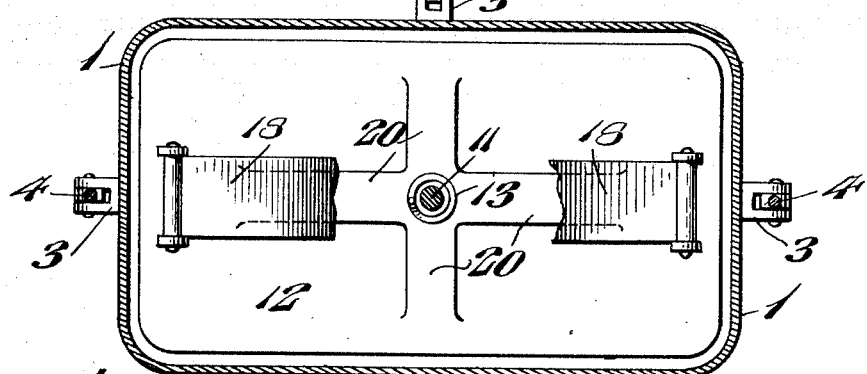
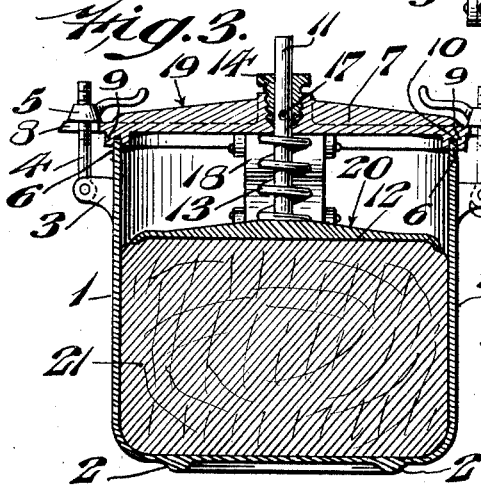
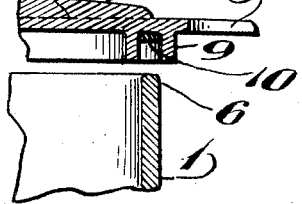

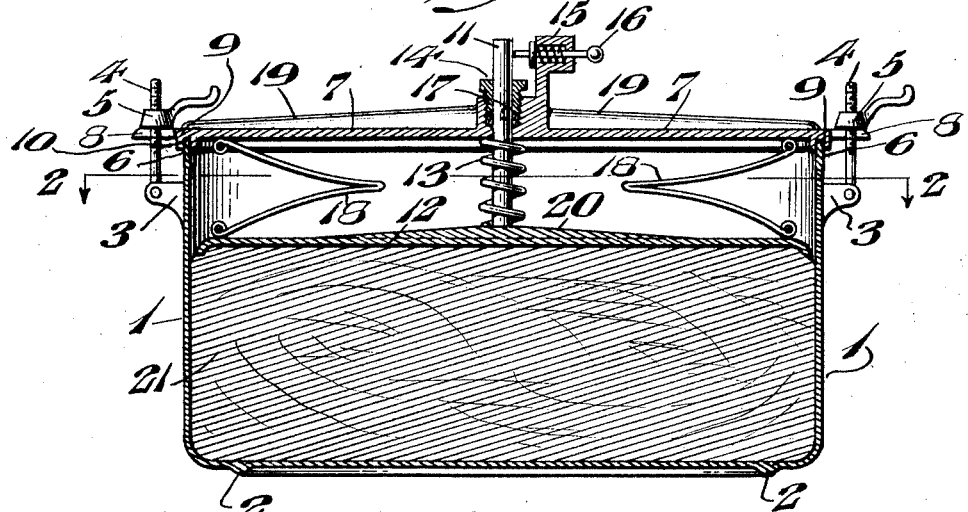
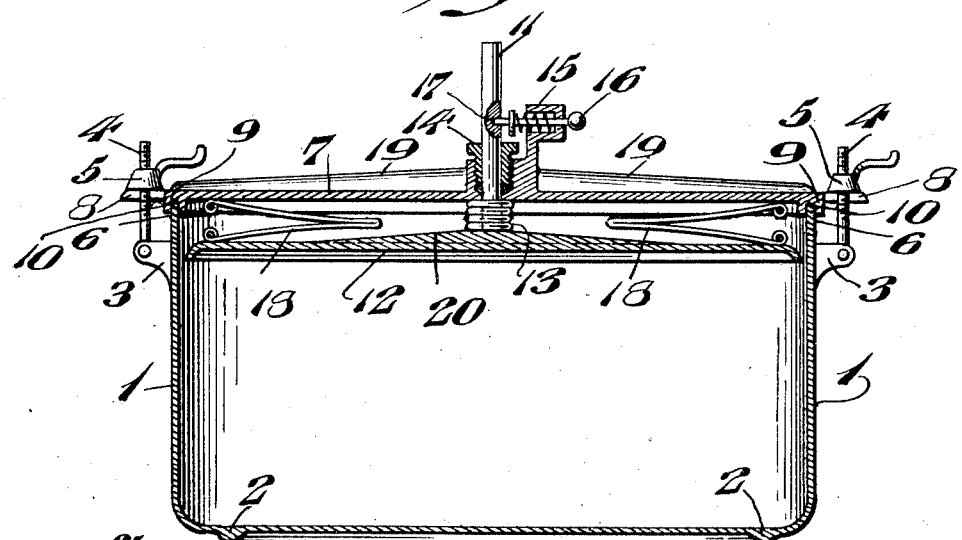
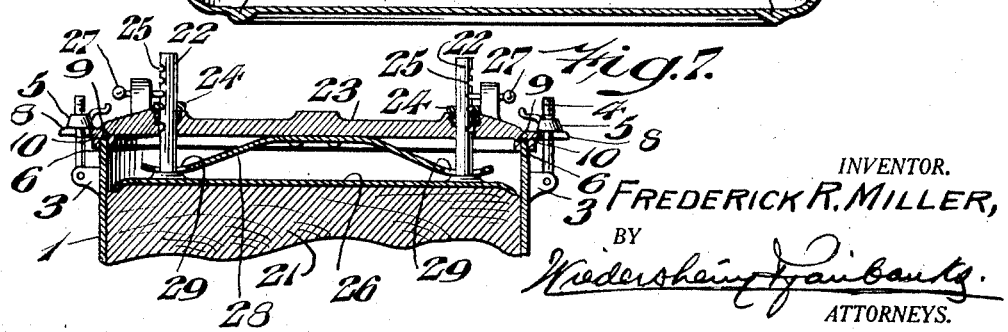

1,738,255

UNITED STATES PATENT OFFICE

FREDERICK R. MILLER, OF JERSEY CITY, NEW JERSEY

COOKING APPARATUS

Application filed April 28, 1928. Serial No. 273,484.

This invention, generally stated, relates to apparatus used in the cooking of meat and has more especial relation to a so-called ham boiler.

The leading object of the present invention may be said to reside in the provision of a vessel of the character stated in which is provided a follower plate which is spring pressed to automatically compress the meat during a boiling or cooking period.

A further object of the present invention is to provide an air-tight joint between the vessel proper and the cover, the same being comprised of a tongue and groove arrangement the parts of which are packed and which may be firmly clamped to place also to prevent the escape of steam from the vessel.

A still further object of the present invention is to provide generally V-shaped resilient members between the follower plate and the cover to assist in the depression of the follower plate.

A still further object of the present invention may be said to reside in the provision of a very simple, compact, convenient, and inexpensive cooking vessel for meats the parts of which are so arranged that tight joints are provided throughout, thus preventing the escape of steam, vapor, and the like from the vessel interior, thereby preventing the meat from drying out in the cooking process so that all the juices and flavor of the meat are preserved.

A still further object of the present invention is to provide an arrangement, construction, and combination of parts whereby the foregoing objects are accomplished.

The nature, characteristic features and scope of the invention will be more fully understood from the following description taken in connection with the accompanying drawings forming part hereof, and in which:

Fig. 1, is a top or plan view of the cooking vessel or container embodying the invention.

Fig. 2, is a view in horizontal section taken upon the line 2—2 of Fig. 5.

Fig. 3, is a view in cross section taken upon the line 3—3 of Fig. 1.

Fig. 4, is a fragmentary view in section of the peripheral groove of the cover for seating over the top edge of the vessel or container.

Fig. 5, is a view in horizontal section taken upon the line 5—5 of Fig. 1.

Fig. 6, is a view in horizontal section similar in all respects to Fig. 5 with the exception that the follower plate is shown in locked position.

Fig. 7, is a view of a somewhat modified form of the invention, the figure being fragmentary in character and being taken in horizontal section.

For the purpose of illustrating my invention I have shown in the accompanying drawings two forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring now to the drawings in detail, the reference numeral 1 designates the vessel or container or boiler and is provided upon its under side with a rib 2. At each end of the vessel or container there is provided a lug 3. Having hinged relation with each lug 3 is a bolt 4, each bolt having a wing nut 5 at its outer threaded end. The upper peripheral edge of the vessel or container is designated 6, best seen in Fig. 6. 7 designates a cover provided with laterally extended, forked members 8, see Fig. 4, to receive the bolts 4. The cover 7 is provided with a pendent peripheral flanged groove 9 for engaging upon the top edge 6 of the vessel or container. In the connection it is to be noted that the groove 9 is provided with packing 10 arranged to abut directly against the upper edge 6 of the vessel or container 1. Arranged centrally of the cover 7 is a vertically disposed stem 11 carrying a follower plate 12. Between the under face of the cover 7 and the top of the follower plate 12 and coiled around the stem 11 is a spring 13. The cover 7 is provided with a stuffing box 14 through which the stem 11 is projected. Carried by the cover 7 is a lug 15, projected horizontally through which is a spring pressed detent 16 for engaging an aperture 17 in the stem 11, as shown in Fig. 6, at predetermined periods. At opposite ends of the vessel or container 1 are relatively V-shaped resilient members considered in elevation and which are designated 18. The function of these springs 18 as well as the spring 13 is to provide the requisite pressure to be exerted upon meat, as for instance ham, during a boiling period. The cover 7 may, if desired, be provided with stiffening ribs 19, see Fig. 1. The follower plate 12, if desired, may also be provided with stiffening ribs 20, see Fig. 2.

A description will now be given of the manner of using the vessel or container. Meat, for instance ham, which is designated 21, is placed in the vessel or container according to proper cooking requisites. The cover 7 with its follower plate in locked position as shown in Fig. 6 is fitted to place and the bolts 4 adjusted with respect to the forked members 8 and the wing nuts screwed to place, thus forcing the peripherally grooved flange 9 with its packing 10 directly down upon the edge 6 of the vessel or container to form a very tight joint. The detent 16 is now moved outwardly, thus causing the springs 13 and 18 to force downwardly the follower plate 12 and exert pressure upon the upper surface of the meat. As the cooking of the meat proceeds, the follower plate 12 follows the meat in its decreasing dimensions and does this automatically so that no further attention is needed until the meat is cooked. Obviously, if in cooking the meat should swell, the springs 18 and 13 permit the upward movement of the follower plate 12 to accommodate the increase in meat dimensions.

By the above described arrangement and combination of parts a cooking vessel or container for meats is provided in which the bottom and sides are closed and the open top closed by a cover forming a tight seal with the edge of the vessel or container top. This seal in conjunction with the fact that the stem of the follower plate moves through a stuffing box upon the cover serves to provide a vessel or container the escape of steam from which is prevented, thus serving to prevent the meat from drying out, thus preserving in the meat the juices and flavor during a cooking period.

Referring to the modified form shown in Fig. 7, instead of having a single stem as shown in the foregoing figures a pair of stems 22 is provided which are movable through the cover 23, stuffing boxes 24 being provided to prevent escape of steam from the vessel or container interior. Instead of the stems having a single aperture as in the foregoing figures, each stem is provided with a series of notches 25 so that vertical adjustments of the follower plate 26 may be made manually as desired as by means of the detents 27 which are similar in all respects to the detents shown in the foregoing figures. Carried by the bottom of the cover 23 is a leaf spring 28, the opposed ends of which are apertured as at 29 so as to fit over the stems 22. Means for clamping the cover with respect to the container constitute parts similar in all respects to the foregoing figures. Also, the flanged groove and its packing as arranged in the cover for fitting over the peripheral top edge of the vessel or container are also similar in all respects to the foregoing figures.

I am aware that the invention may be embodied in other specific forms without departing from the spirit or essential attributes thereof, and I therefore desire the present embodiment to be considered in all respects as illustrative and not restrictive, reference being had to the appended claim rather than to the foregoing description to indicate the scope of the invention.

Having thus described my invention, what I claim as new, and desire to secure by Letters Patent, is:

A cooking vessel for meats comprising a relatively shallow container of integral structure having a closed bottom and an open top, said open top being provided with a peripheral edge, a cover for the open top of said container, said cover being provided with a flanged groove for snugly fitting over the said edge of said vessel, a packing in said flanged groove, a follower plate having fixed thereto a notch stem projected through said cover, a stuffing box through which said stem functions, resilient means interposed between said cover and said follower plate, said resilient means comprising a spring coiled around said stem and a pair of oppositely disposed relatively V-shaped springs, and a spring pressed detent operative to engage said notched stem to retain said follower plate elevated against the action of said resilient means.

FREDERICK R. MILLER.